United States Patent
Griffin

(10) Patent No.: US 12,172,771 B2
(45) Date of Patent: Dec. 24, 2024

(54) ONBOARD AIRCRAFT OXYGEN GENERATION SYSTEM

(71) Applicant: AIRBUS AMERICAS, INC., Herndon, VA (US)

(72) Inventor: Mark Griffin, Elberta, AL (US)

(73) Assignee: AIRBUS AMERICAS, INC., Herndon, VA (US)

( * ) Notice: Subject to any disclaimer, the term of this patent is extended or adjusted under 35 U.S.C. 154(b) by 492 days.

(21) Appl. No.: 17/448,646

(22) Filed: Sep. 23, 2021

(65) Prior Publication Data

US 2023/0086314 A1 Mar. 23, 2023

(51) Int. Cl.
*C25B 1/02* (2006.01)
*B01D 53/32* (2006.01)
*B64D 37/32* (2006.01)

(52) U.S. Cl.
CPC ........... *B64D 37/32* (2013.01); *B01D 53/326* (2013.01); *B01D 2259/4575* (2013.01)

(58) Field of Classification Search
CPC ........ B01D 2259/45; B01D 2259/4575; C25B 1/02
See application file for complete search history.

(56) References Cited

U.S. PATENT DOCUMENTS

| | | |
|---|---|---|
| 5,154,374 A | 10/1992 | Beroth |
| 5,984,415 A | 11/1999 | Schumacher et al. |
| 6,352,624 B1 | 3/2002 | Crome et al. |
| 9,016,279 B2 | 4/2015 | Guering |
| 9,550,570 B2 | 1/2017 | Kshirsagar et al. |
| 2005/0116101 A1 | 7/2005 | Pozzi et al. |
| 2006/0174965 A1* | 8/2006 | Hobbs ........................ F17C 5/04 518/702 |
| 2007/0158500 A1* | 7/2007 | Sridhar .................. B64D 13/00 244/118.5 |
| 2009/0145428 A1* | 6/2009 | Sward ................... A61M 16/10 128/202.26 |
| 2016/0144973 A1* | 5/2016 | Darling .................. A62C 3/065 204/265 |

FOREIGN PATENT DOCUMENTS

| | | |
|---|---|---|
| DE | 3719105 A1 | 12/1988 |
| FR | 2753170 A1 | 9/1996 |
| WO | 2005047104 A2 | 5/2005 |

OTHER PUBLICATIONS

Arnold, Mark. "US Army Oxygen Generation System Development", NATO paper.
"An Electrochemical Device for Oxygen Production Avoiding the Generation of Hydrogen," Journal of Applied Electrochemistry, Aug. 1996, vol. 26, Issue 9, pp. 881-885.

\* cited by examiner

*Primary Examiner* — Zulmariam Mendez
(74) *Attorney, Agent, or Firm* — Sterne, Kessler, Goldstein & Fox P.L.L.C.

(57) ABSTRACT

An onboard oxygen generation system for an aircraft is operatively connected to an oxygen tank of an oxygen supply system for the aircraft. The oxygen generation system includes an oxygen generator, a water source connected to the oxygen generator, and a power source connected to the oxygen generator. Oxygen produced by the oxygen generator from the water is supplied to the oxygen tank. Hydrogen gas produced by the oxygen generator can be combined with air to form water vapor and either discharged overboard the aircraft through a discharge vent or used to supply water to the water source.

17 Claims, 5 Drawing Sheets

ONBOARD AIRCRAFT OXYGEN GENERATION SYSTEM

BACKGROUND

Field

The present disclosure relates to systems and methods of replenishing breathing oxygen stored onboard aircraft. More specifically, aspects of the present disclosure relate to lightweight oxygen generation systems that can be integrated into existing commercial passenger aircraft.

Background

Oxygen systems are a required system on many different aircraft, and in particular those aircraft that are operated at higher altitudes. Pressurized aircraft allow passenger and crew to forgo receiving supplemental oxygen when the aircraft is above a certain altitude. However, these aircraft still require oxygen systems that are able to be deployed in case of a failure of the pressurization system. Many of these systems store oxygen as a compressed gas in appropriate containers, such as oxygen tanks. The stored oxygen is used during routine operation of the aircraft, e.g. during systems checks, and must be periodically replenished to ensure that sufficient oxygen remains onboard for emergency use. Resupplying the oxygen stores on commercial passenger aircraft is typically accomplished manually by technicians on the ground by either refilling the oxygen tanks in place or replacing the depleted tanks with filled tanks. Both techniques involve handling of pressurized oxygen gas, which requires significant safety procedures. Further, the operating cycles of typical passenger aircraft results in a relatively frequent need to replenish the oxygen, which increases maintenance costs.

BRIEF SUMMARY

An aspect of an onboard oxygen refilling system for an aircraft includes an electrochemical oxygen gas generator on an aircraft. The oxygen gas generator includes a housing with an electrolytic cell disposed in the housing comprising a cathode and an anode. A humid air supply is fluidly connected to an inlet of the electrochemical oxygen gas generator and an oxygen tank is fluidly connected to an outlet of the electrochemical oxygen gas generator. A power supply is operatively connected to the cathode and anode of the electrochemical oxygen gas generator, where the electrochemical oxygen gas generator uses power from the power supply to convert water from the humid air supply to oxygen gas and replenish the oxygen gas in the oxygen tank.

An aspect of a method of onboard replenishment of an aircraft oxygen system includes supplying water from a water source disposed onboard an aircraft to an oxygen gas generator; supplying power from a power source disposed onboard an aircraft to an oxygen gas generator; generating oxygen at the oxygen gas generator using the supplied water and the supplied power; and supplying the oxygen to an oxygen tanks disposed onboard the aircraft for storage.

Implementations of any of the techniques described above can include a system, a method, a process, a device, and/or an apparatus. The details of one or more implementations are set forth in the accompanying drawings and the description below. Other features will be apparent from the description and drawings, and from the claims.

Further features and advantages of the disclosure, as well as the structure and operation of various aspects of the disclosure, are described in detail below with reference to the accompanying drawings. It is noted that the disclosure is not limited to the specific aspects described herein. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate the aspects and, together with the description, further serve to explain the principles and to enable a person skilled in the relevant art(s) to make and use the aspects. Objects and advantages of illustrative, non-limiting aspects will become more apparent by describing them in detail with reference to the attached drawings.

DETAILED DESCRIPTION

Figure 1:
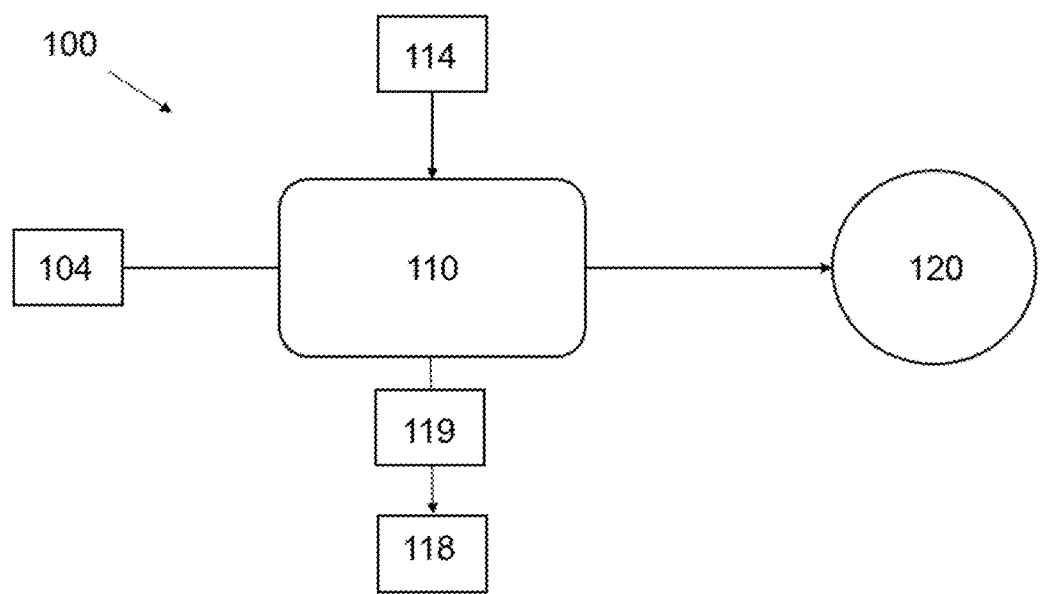
FIG. 1 is a system diagram of an onboard oxygen generation and storage system for a commercial passenger aircraft according to various aspects.

Aspects of the present disclosure are described in detail with reference to aspects thereof as illustrated in the accompanying drawings. References to "one aspect," "an aspect," "some aspects," etc., indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Spatially relative terms, such as "beneath," "below," "lower," "above," "on," "upper," "opposite" and the like, may be used herein for ease of description to describe one element or feature's relationship to another element(s) or feature(s) as illustrated in the figures. The spatially relative terms are intended to encompass different orientations of the device in use or in operation in addition to the orientation depicted in the figures. The apparatus may be otherwise oriented (e.g., rotated 90 degrees or at other orientations) and the spatially relative descriptors used herein may likewise be interpreted accordingly.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

As discussed above, systems that supply oxygen to occupants are required onboard many aircraft. Many oxygen system store oxygen in compressed form in suitable containers or tanks. The oxygen stored in the tanks must be replenished as it is used during normal operation to ensure that sufficient oxygen remains onboard the aircraft for emergency use. Existing onboard oxygen systems require manual replenishment by technicians, which creates aircraft downtime and additional maintenance expenses. Thus there exists a need for a system and method for onboard oxygen replenishment.

An aspect of an onboard oxygen refilling system for an aircraft includes an electrochemical oxygen gas generator on an aircraft. The oxygen gas generator includes a housing with an electrolytic cell disposed in the housing comprising a cathode and an anode. A humid air supply is fluidly connected to an inlet of the electrochemical oxygen gas generator and an oxygen tank is fluidly connected to an outlet of the electrochemical oxygen gas generator. A power supply is operatively connected to the cathode and anode of the electrochemical oxygen gas generator, where the electrochemical oxygen gas generator uses power from the power supply to convert water from the humid air supply to oxygen gas and replenish the oxygen gas in the oxygen tank.

Some benefits of this system include reducing or eliminating the need to manually replenish the oxygen supply, which reduces aircraft downtime for maintenance and maintenance costs. This system also allows for a relatively smaller oxygen tank to be used onboard the aircraft because the oxygen tank can be maintained at a full or nearly full state during operation, which in turn can reduce aircraft weight. Finally, the smaller size of the compressed oxygen tank and reduced or eliminated maintenance requirements of the oxygen storage system can allow the oxygen tank and generation system to be placed in alternate locations onboard the aircraft, which can improve the space utilization and flexibility onboard the aircraft.

FIG. 1 is a system diagram of an aspect of an oxygen system 100 for an aircraft. Oxygen system 100 includes two main components: oxygen generation system 110 and oxygen supply system 120. As seen in FIG. 1, oxygen generation system 110 is fluidly connected to oxygen supply system 120 to provide oxygen to replenish oxygen stored in oxygen supply system 120. In turn, oxygen supply system 120 includes all the elements necessary to store breathable oxygen gas onboard an aircraft and to supply that gas to the crew onboard the aircraft as needed. The details of oxygen generation system 110 and oxygen supply system 120 will be discussed in detail below.

Also seen in FIG. 1 is a power source 114 that is operatively connected to oxygen generation system 110. Power source 114 can be any suitable electrical power source located onboard the aircraft that is connected oxygen generation system 110 to supply power for the oxygen generation process. In an aspect, power source 114 can be configured to receive power from a ground power unit that is connected to the aircraft when the aircraft is on the ground. Connecting an aircraft to a ground power unit when the aircraft is on the ground is routinely done to ensure that the aircraft battery is not discharged excessively while the aircraft engine or engines (and the corresponding power generators) are offline. Linking oxygen generation system 110 to the ground power connection ensures that oxygen generation system 110 does not discharge the aircraft battery while the aircraft is on the ground.

A water source 104 disposed on the aircraft and connected to oxygen generation system 110 is also shown in FIG. 1. As will be discussed in below, oxygen generation system 110 consumes water to produce oxygen, and thus water source 104 disposed on the aircraft must be connected to oxygen generation system 110. In an aspect, water source 104 extracts water from a supply of humid air. In an aspect, the humid air is sourced from the atmosphere outside of the aircraft. In another aspect, water source 104 is a supply of water onboard the aircraft, for example, the aircraft cabin humidifier system or an onboard water tank. Details of different aspects of water source 104 are discussed below.

During operation, oxygen generation system 110 produces hydrogen gas as a byproduct. Hydrogen gas is extremely flammable and cannot be allowed to build up in the interior of the aircraft (i.e., where oxygen generation system 110 is located). In an aspect, the hydrogen gas is combined with oxygen in air sourced from the atmosphere outside of the aircraft to produce water vapor in a hydrogen gas combiner 119. The exhaust and water vapor can be routed through a discharge vent 118 $t$ to an exterior of the airplane, or back to water source 104 to supply water to oxygen generation system 110. In these aspects, hydrogen gas combiner 119 can be, for example, a fuel cell configured to combine hydrogen gas and atmosphere to produce water vapor and electricity, which can then be used to supplement the power supplied to oxygen generation system 110. In another aspect discharge vent 118 is connected to oxygen generation system 110 and routes the excess hydrogen gas to an exterior of the aircraft. Thus discharge vent 118 transports the hydrogen gas to an exterior of the aircraft to prevent hydrogen gas buildup onboard the aircraft. In some aspects, a discharge diluter 119a is part of or is connected to discharge vent 118 may also be connected in line with discharge vent 118. Discharge diluter 119a can blend the discharged hydrogen gas with ambient atmosphere to lower the concentration of hydrogen gas in the resulting discharged gas stream, thus lowering the flammability of the resulting discharged gas. Discharge diluter 119a can be a blending valve that receives a supply of air (e.g., from the atmosphere outside of the aircraft through a blower fan) as one input and the hydrogen gas as another input. The flow rates of the two input streams of gas (i.e., the ambient atmosphere and the hydrogen gas) can be controlled by adjusting the valve, thereby ensuring that the resulting hydrogen gas concentration in the discharge stream is sufficiently low. In some aspects, the atmosphere received by discharge diluter 119a is sourced from the pressurized cabin atmosphere to ensure sufficient supply of ambient atmosphere. In another aspect, hydrogen gas combiner 119 is a combustor that burns the hydrogen gas with air from outside of the aircraft to form the water vapor. As discussed above, the water vapor can be vented outside the aircraft or recycled into water source 104.

All of the elements of oxygen system 100 discussed above are disposed onboard the aircraft in any suitable space. For example, elements of oxygen system 100 can be disposed in the cargo bay, accessory bay, or avionics bay onboard the aircraft.

Figure 2:
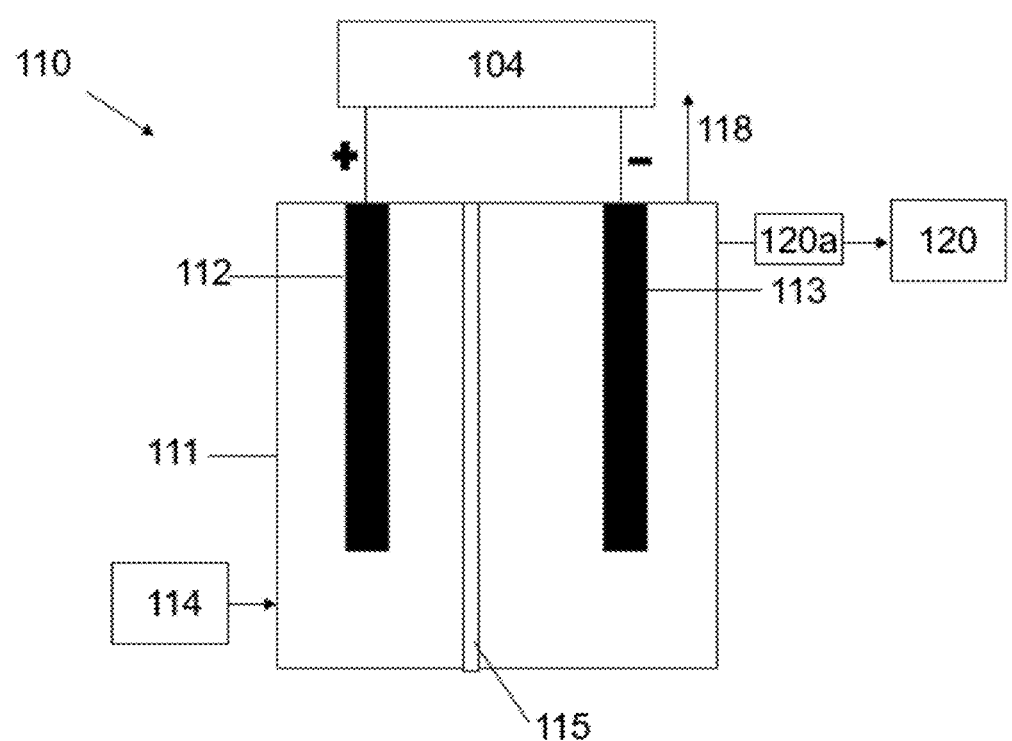
FIG. 2 is a schematic diagram of on onboard oxygen generator according to various aspects.
Figure 3:
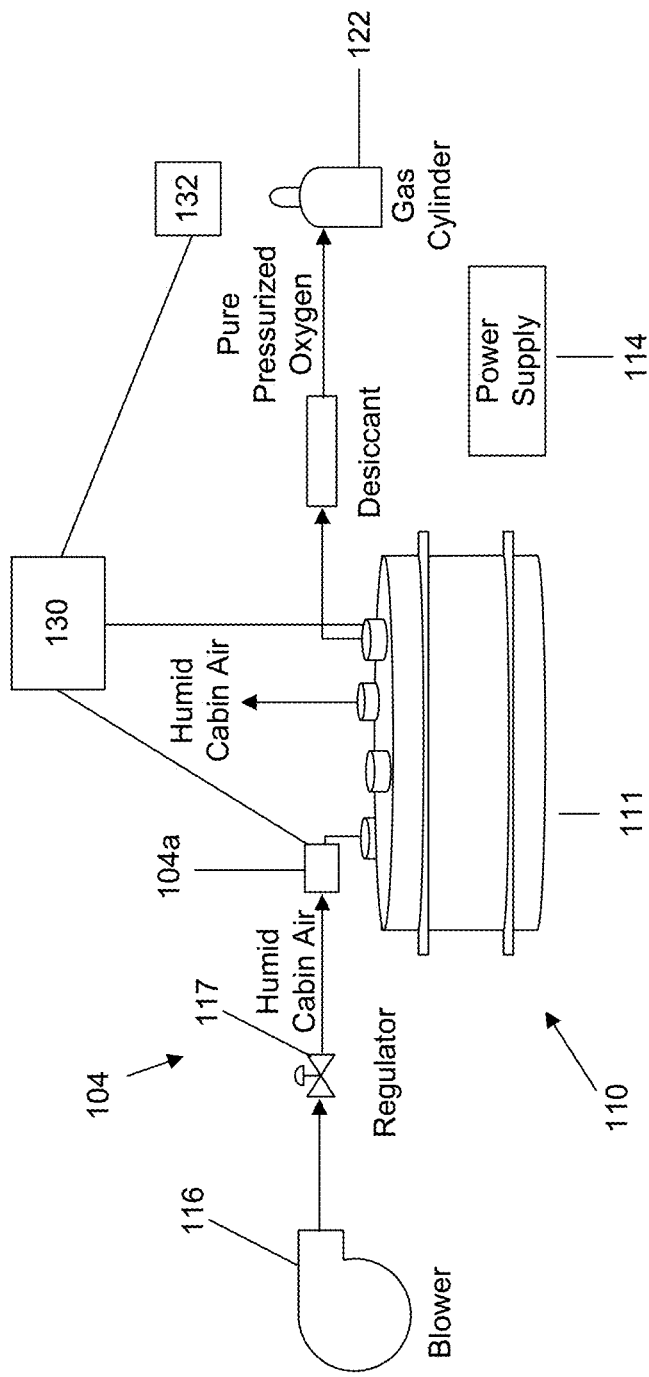
FIG. 3 is a system diagram of an oxygen supply system according to various aspects.

FIGS. 2 and 3 show aspects of oxygen generation system 110. These aspects of oxygen generation system 110 generate oxygen through the electrolysis of water. As seen in FIGS. 2 and 3, oxygen generation system 110 includes a housing 111 that is a fluid-tight container. Housing 111 can be made from any suitable material, including metals such as steel and composite or plastic materials. Housing 111 contains an electrolytic cell that includes a positively changed anode 112 and a negatively charged cathode 113. Anode 112 and cathode 113 are formed from a conductive material such as a metal (e.g., steel, aluminum, or copper) and are operatively connected to the positive and negative voltage, respectively, that is suppled from power source 104.

The interior of housing 111 is supplied with water from water source 104 such that anode 112 and cathode 113 are at least partially immersed in the water. When power is applied to anode 112 and cathode 113, the water molecules in housing 111 are split into oxygen and hydrogen gas. The oxygen gas is collected and routed to oxygen supply system 120. Oxygen generation system 110 produces oxygen gas at the pressure needed to refill oxygen tank 122. This eliminates the need for additional compressors or pumps, which reduces system complexity, weight, and power requirements. For example, oxygen generation system can produce oxygen gas at approximately 1850 pounds per square inch ("psi"). High pressure oxygen gas is produced by the electrolytic cell by continuously producing oxygen gas. In an aspect, the oxygen can be extracted through a high pressure water gas separator 120a before sending the pressurized oxygen to oxygen supply system 120. The electrolytic cell is equipped with a membrane 115 that separates the oxygen side (i.e., anode 112) from the hydrogen side (i.e., cathode 113) to allow the hydrogen gas to be produced at ambient pressure. Membrane 115 allows for proton exchange between these two sides to enable operation of the electrolytic cell. In an aspect, additional filters, desiccants, or other purification elements may be placed in line between the oxygen output of oxygen generation system 110 and oxygen supply system 120 to ensure that the oxygen gas received by oxygen supply system 120 is sufficiently pure. The hydrogen gas produced by oxygen generation system 110 is routed to discharge vent 118 and then to the atmosphere as discussed above.

Figure 4:
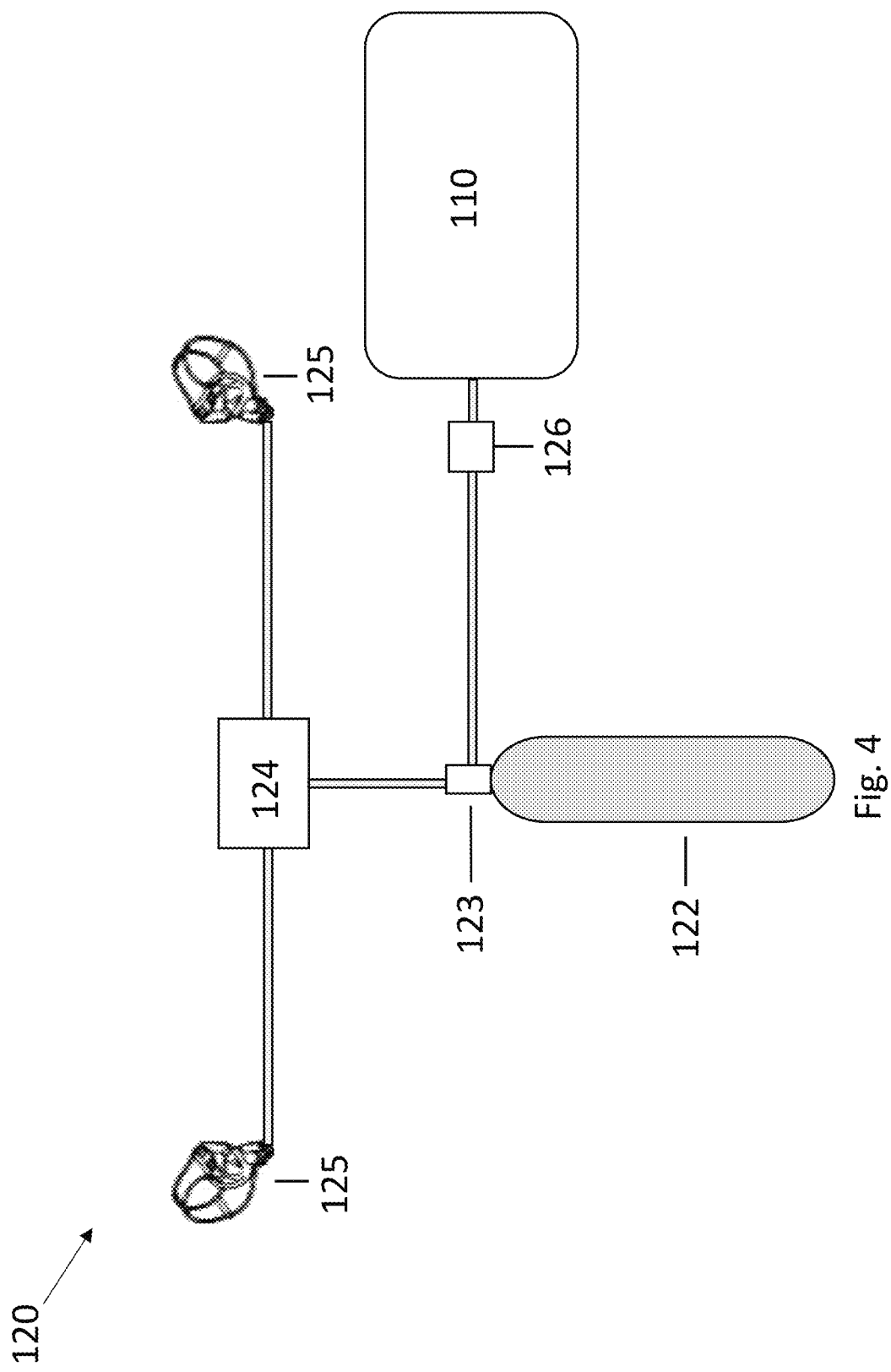
FIG. 4 is a system diagram of an oxygen supply system according to various aspects.

In an aspect, water source 104 receives humid air and uses a water extractor 104a to extract water from the air for use in oxygen generation system 110. Water extractor 104a can be, for example, a condenser system that chills the incoming air to extract the water. In another aspect water extractor 104a can be a desiccant-based water extractor that uses desiccant material to absorb the water from the air for use in oxygen generation system 110. The air received by these aspects of water source 104 can be sourced from the atmosphere outside of the aircraft. In an aspect, the humidity of the air received by water extractor 104a can be at least 10% absolute humidity, at least 20% absolute humidity, at least 30% absolute humidity, at least 40% absolute humidity, at least 60% absolute humidity, or at least 80% absolute humidity for sufficient water extraction. This aspect of water source 104 can simplify the required plumbing integration from water source 104 because the moisture extractor can be physically co-located with oxygen generation system 110 and only needs to be supplied with air from the atmosphere exterior to the aircraft and electrical power. As shown in FIG. 4, these aspects of water source 104 can include a blower 116 and regulator 117 that supply humid cabin air to oxygen generation system 110.

In some aspects, water source 104 can be a connection to a water source onboard the aircraft (e.g., the onboard water tankage for lavatory use or an existing cabin air humidifier system).

FIG. 3 shows an aspect of oxygen supply system 120. Compressed oxygen is stored in an oxygen tank 122. Oxygen tank 122 can be sized to provide sufficient breathing oxygen for a predetermined time to a set number of users. For example, oxygen tank 122 may contain sufficient oxygen for four users for 15, 20, or 30 minutes as determined based on a desired oxygen flow rate per person. Oxygen tank 122 is connected to a pressure regulator 123 that regulates the high pressure oxygen in oxygen tank 122 to a suitable pressure for breathing. A distribution manifold 124 is fluidly connected to the output of pressure regulator 123. Distribution manifold 124 includes the necessary piping, tubing, valves, and flow regulators needed to route oxygen to oxygen masks 125 for distribution to the end users. There may be any number of oxygen masks 125 connected to distribution manifold 124.

In the aspect of oxygen supply system 120 shown in FIG. 3, a refill port 126 is fluidly connected to oxygen tank 122 to allow for manually refilling oxygen tank 122 from an exterior oxygen source for maintenance purposes. Refill port 126 may be any suitable refilling valve that can handle pressurized oxygen gas. For example, refill port 126 may be an AN800-3 oxygen fill adapter coupled to an appropriate check valve. Oxygen supply systems 120 with refill port 126 are prevalent on existing oxygen supply systems 120 and can be retrofitted with oxygen generation system 110, as discussed below. New installations of oxygen supply systems 120 intended to be integrated with oxygen generation system 110 do not require refill port 126.

In the aspect of FIG. 3, oxygen generation system 110 is shown connected to refill port 126, which allows oxygen generation system 110 to supply oxygen to oxygen tank 122 in the same manner as is accomplished with a manual resupply. This aspect of the integration of oxygen generation system 110 and oxygen supply system 120 can be beneficial in aircraft that have oxygen supply systems 120 with refill port 126 because the integration requires only minimal modification to the existing connections of refill port 126.

Other aspects of oxygen supply system 120 do not include a refill port 126. In these aspects oxygen tank 122 can be replenished by physically removing and replacing oxygen tank 122. Integration with oxygen generation system 110 in these systems can be accomplished by fluidly connecting oxygen generation system 110 directly to oxygen tank 122 through use of suitable tubing, piping, and valves. Once oxygen generation system 110 is connected to oxygen tank 122, oxygen tank 122 can be replenished without needing to physically remove and replace the tank.

Both of the above aspects of integrating oxygen generation system 110 can be designed to be retrofitted onto existing aircraft to integrate with an existing oxygen supply system 120.

A method of resupplying an oxygen supply system 120 on an aircraft begins by connecting an oxygen generation system 110 to an oxygen supply system 120. As discussed above, in some aspects oxygen generation system 110 can be retrofitted onto existing aircraft by connecting oxygen generation system 110 to the existing onboard oxygen tank 122 either through refill port 126 or by direct integration into the existing oxygen supply fittings, regulators, or valves. Oxygen generation system 110 is supplied with power from a power source 114 and water from a water source 104. Water source 104 can be equipped with suitable pumps, tubing, and valves to transport water to oxygen generation system 110. For example, in an aspect, water source 104 extracts moisture from the atmosphere exterior to the aircraft to generate the required water. In another aspect, water source 104 is an existing onboard water supply (e.g., a supply of water for lavatory use). In another aspect, water source 104 is a dedicated water tank that is located onboard the aircraft.

Oxygen generation system 110 uses electrolysis to separate the water into oxygen and hydrogen gases. In an aspect, oxygen generation system 110 is operatively connected to existing onboard pressure sensors that monitor the oxygen pressure in oxygen tank 122. In another aspect, oxygen generation system 110 includes a dedicated pressure sensor 132 that is operatively connected to oxygen tank 122 to transmit pressure readings to a controller 130. When controller 130 receives a pressure reading from pressure sensor 132 that is below a threshold pressure, controller 130 activates oxygen generation system 110 by activating electrical flow from power source 104 to oxygen generation system 110 such that electricity flows to anode 112 and cathode 113. Controller 130 also activates water source 104 to supply water to housing 111 of oxygen generation system 110. In an aspect, activating water source 104 include activating blower 116, regulator 117, and water extractor 104a. The water in housing 111 is then split into oxygen gas and hydrogen gas by electrolysis to generate the oxygen gas. The oxygen gas is produced by oxygen generation system 110 at high pressure (e.g., 1850 psi). Finally, the oxygen gas is supplied to oxygen tank 122 of oxygen supply system 120 to replenish the stored oxygen. When controller 130 receives a pressure reading from pressure sensor 132 that exceeds a target pressure, the power and water supplied to oxygen generation system 110 is turned off. In this way, the controller 130 ensures that pressure in oxygen tanks 122 is maintained in a desired pressure range. For example, the low setpoint that triggers activation of oxygen generation system 110 can be set at 1825 psi. The high setpoint that corresponds to a full oxygen tank 122 can be set at the service pressure of oxygen tank 122 at, for example, 1850 psi. Thus, controller 130 will maintain the pressure within oxygen tank 122 between 1825 psi and 1850 psi.

As discussed above, the hydrogen gas produced by the electrolysis process can be vented overboard via discharge vent 118. In some aspects, the hydrogen gas is combined with air to form water vapor as discussed above. The water vapor can be vented overboard via discharge vent 118 or routed back to water source 104 to supply water to oxygen generation system 110. In some aspects, the hydrogen gas is blended with air from outside of the aircraft at discharge diluter 119a to reduce the flammability of the resulting discharged gas. In some aspects, this method of operation can be designed to operate during aircraft down time, such as when the aircraft is parked when it is not in use. For example, controller 130 of oxygen generation system 110 may be connected to sensors onboard the aircraft that indicate whether the airplane is on the ground (e.g., a landing gear weight sensor, a ground speed sensor, or a cabin door open sensor) and whether the aircraft is connected to ground power. In an aspect, controller 130 will only activate oxygen generation system 110 when both of these sensors indicate the aircraft is on the ground and is connected to ground power.

In another aspect, controller 130 may be programmed to operate during predetermined times, for example, when the aircraft is not in use. Controller 130 may also be configured to activate oxygen generation system 110 on demand (e.g., by manual activation by aircraft crew) or as needed based on oxygen tank 122 pressure readings.

Figure 5:
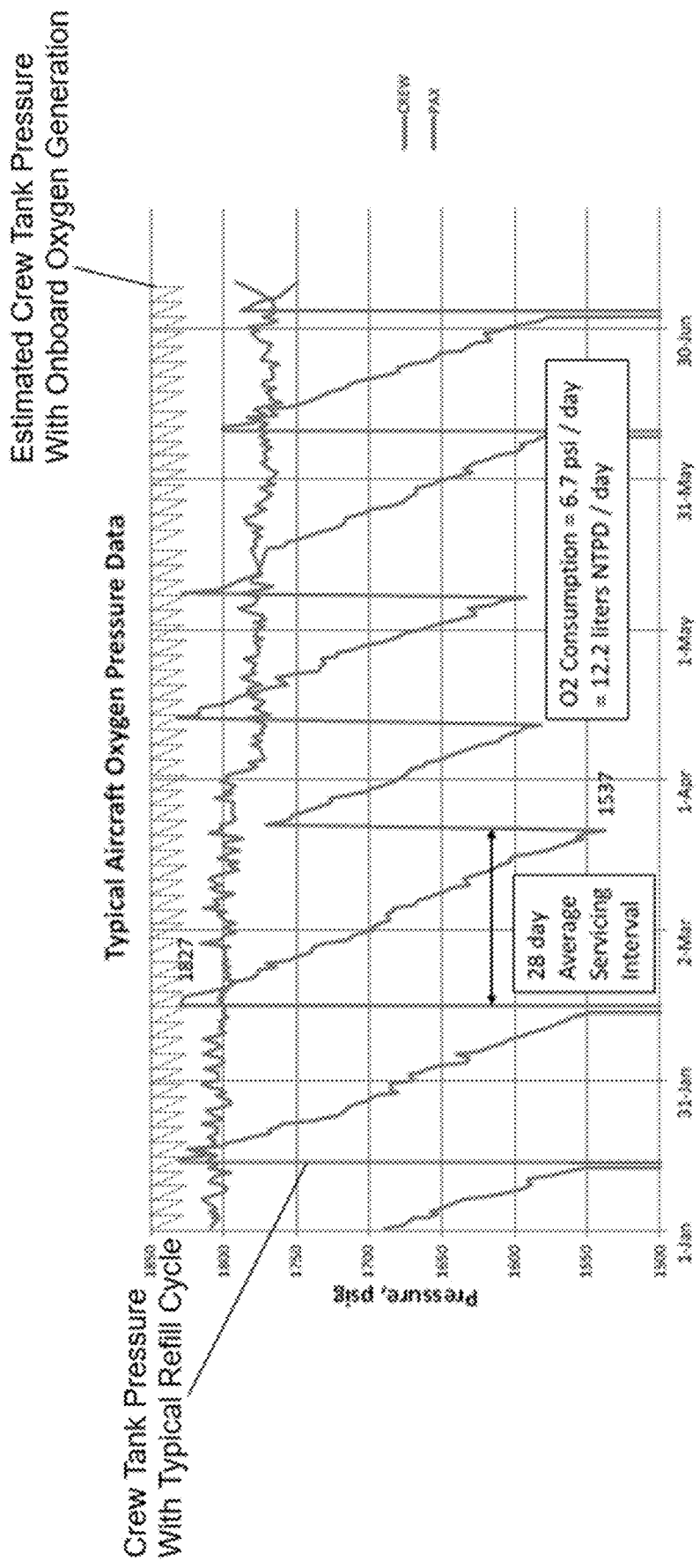
FIG. 5 is a chart showing oxygen supply system pressure of an aircraft's onboard oxygen supply system during use conditions.

Benefits of the above systems and methods include reducing or eliminating the need to manually resupply oxygen supply system 120. This reduces maintenance costs and improves safety because of the elimination of the need to handle compressed oxygen gas, which can be hazardous if mishandled. Another benefit is the potential reduction in size of oxygen tank 122. Current systems require oxygen tank 122 to be sized to accommodate a targeted maintenance cycle. A pressure diagram of pressure in oxygen tank 122 during a typical use cycle is shown in FIG. 5. For an oxygen supply system 120 that does not utilize oxygen generation system 110, the typical replenishment cycle for the oxygen cylinders is approximately 28 days, and as can be seen in the chart, oxygen pressure drops from a service pressure over 1800 psi to at or below 1600 psi during the replenishment cycle. In this case, oxygen tank 122 must be sized such that it has the necessary supply capacity even at the end of the 28 day cycle when the supply has been depleted to its lowest amount (i.e., when tank pressure is at or below 1600 psi). This requires a larger oxygen tank 122, which increases weight, volume, and cost of oxygen supply system 120. The systems and methods of the present disclosure are able to maintain oxygen tank 122 at or close to a filled state at all times.

As shown by the dashed line at the top of FIG. 5, frequent resupply by oxygen generation system 110 means that tank pressure only varies by a small amount (e.g., 25 psi) during use. The run cycle of oxygen generation system 110 may be as frequently as needed. For example, oxygen generation system 110 may run daily when the aircraft is not in use on the ground, or may run less frequently. This means that oxygen tank 122 does not need to be sized to account for a reduced pressure state (e.g., 1600 psi in the example of FIG. 5) caused by the maintenance cycle delay. A final benefit of the systems and methods discussed here are, in some cases, the ability to relocate oxygen tank 122 because oxygen tank 122 no longer needs to be easily accessible for frequent maintenance. This is especially relevant in aircraft that require oxygen tank 122 to be replaced entirely whenever oxygen tank 122 needs to be serviced because in those aircraft oxygen tank 122 is typically located near an external access hatch.

It is to be appreciated that the Detailed Description section, and not the Brief Summary and Abstract sections, is intended to be used to interpret the claims. The Summary and Abstract sections may set forth one or more but not all aspects of the support assembly system and apparatus, and thus, are not intended to limit the present aspects and the appended claims.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. An onboard oxygen refilling system for an aircraft, comprising:
   an electrochemical oxygen gas generator on an aircraft, the oxygen gas generator comprising:
      a housing; and
      an electrolytic cell disposed in the housing comprising a cathode and an anode;
   a water source comprising an extractor that extracts moisture from air sourced from an exterior of the aircraft to provide water to the oxygen gas generator;
   a humid air supply fluidly connected to an inlet of the electrochemical oxygen gas generator;

an oxygen tank fluidly connected to an outlet of the electrochemical oxygen gas generator a pressure regulator fluidly connected to the oxygen tank and configured to regulate a pressure of oxygen output from the oxygen tank; and a power supply operatively connected to the cathode and anode of the electrochemical oxygen gas generator, wherein the electrochemical oxygen gas generator uses power from the power supply to convert water from the humid air supply to oxygen gas and replenish the oxygen gas in the oxygen tank.

2. The onboard oxygen refilling system of claim 1, further comprising:

a hydrogen gas combiner that received hydrogen gas produced by the oxygen gas generator and combines the hydrogen gas with the humid air supply to form water vapor.

3. The onboard oxygen refilling system of claim 1, further comprising a discharge vent disposed in the aircraft and configured to receive hydrogen gas produced by the oxygen gas generator and vent the hydrogen gas to an exterior of the aircraft.

4. The onboard oxygen refilling system of claim 3, further comprising a discharge vent dilutor connected to the discharge vent that is configured to blend the hydrogen gas with air to dilute the concentration of the hydrogen gas that is discharged.

5. The onboard oxygen refilling system of claim 1, wherein the air supplied to the extractor has at least a 40% relative humidity.

6. The onboard oxygen refilling system of claim 1, further comprising a blower configured to supply the air to the water source.

7. The onboard oxygen refilling system of claim 1, wherein the water source is fluidly connected to a source of water onboard the aircraft.

8. The onboard oxygen refilling system of claim 1, further comprising a pressure sensor connected to the oxygen tank, wherein a controller connected to the pressure sensor and to the electrochemical oxygen gas generator activates the electrochemical oxygen generator to supply oxygen to the oxygen tank when the controller receives a pressure sensor signal indicating the pressure in the oxygen tank is below a low pressure limit.

9. The onboard oxygen refilling system of claim 8, wherein the low pressure limit is approximately 1825 psi, and wherein the controller is further configured to deactivate the electrochemical oxygen generator when the pressure sensor detects a tank pressure exceeding an upper pressure limit of approximately 1850 psi.

10. A method of onboard replenishment of an aircraft oxygen system, comprising:

supplying water from a water source disposed onboard an aircraft to an oxygen gas generator;

supplying power from a power source disposed onboard an aircraft to an oxygen gas generator;

generating oxygen and hydrogen gas at the oxygen gas generator using the supplied water and the supplied power;

diluting the hydrogen gas before it is discharged through a discharge vent by blending the hydrogen gas with air;

discharging the diluted hydrogen gas through the discharge vent to an exterior of the aircraft; and supplying the oxygen to an oxygen tank disposed onboard the aircraft for storage at an elevated pressure.

11. The method of onboard oxygen replenishment of claim 10, wherein supplying water from the water source further comprises extracting water from an air from an exterior of the aircraft using an extractor that received the ambient atmosphere.

12. The method of onboard oxygen replenishment of claim 10, further comprising combining hydrogen gas produced by the oxygen gas generator with air to form water vapor.

13. The method of onboard oxygen replenishment of claim 10, further comprising:

sensing a low pressure state in the oxygen tank; and activating the generating step only after the lower pressure state has been sensed.

14. The method of onboard oxygen replenishment of claim 10, further comprising sensing that the aircraft is on the ground before activating the generating step.

15. The method of onboard oxygen replenishment of claim 10, wherein supplying water from the water source further comprises supplying water from a source of water onboard the aircraft.

16. The method of onboard oxygen replenishment of claim 10, further comprising determining that a current time falls within a predetermined time range before activating the generating step.

17. The method of onboard oxygen replenishment of claim 13, wherein the low pressure state is defined as 25 psi below a service pressure of the oxygen tank.

* * * * *